United States Patent [19]
Funk

[11] 3,950,146

[45] Apr. 13, 1976

[54] CONTINUOUS PROCESS FOR ENERGY CONSERVING COOPERATIVE COAL FEEDING AND ASH REMOVAL OF CONTINUOUS, PRESSURIZED COAL GASIFIERS AND THE LIKE, AND APPARATUS FOR CARRYING OUT THE SAME

[75] Inventor: Erwin D. Funk, Glens Falls, N.Y.

[73] Assignee: Kamyr, Inc., Glens Falls, N.Y.

[22] Filed: Aug. 8, 1974

[21] Appl. No.: 496,023

[52] U.S. Cl.................. 48/69; 48/86 R; 48/197 R; 48/210; 48/DIG. 7; 110/31; 110/101 R; 110/165 R; 214/17 B; 214/17 CC; 302/14; 302/66
[51] Int. Cl.².......................... C10J 3/30; C10J 3/50
[58] Field of Search............. 48/197, 202, 203, 206, 48/210, 63, 73, 76, 77, 69, 86 R, 87, 89, 99, 101, 86 A, DIG. 3, DIG. 4, DIG. 7; 302/11, 14, 15, 16, 66; 214/35 A, 17 CC, 17 R, 17 B; 110/165 R, 171, 31, 101 R, 7 S, 28 M, 28 Y, 28 Q, 28 W; 222/194; 209/2, 11, 12, 234, 258, 256, 268; 210/297, 400; 162/237, 246

[56] References Cited
UNITED STATES PATENTS

| | | | |
|---|---|---|---|
| 2,738,263 | 3/1956 | Peery et al............................. | 48/206 |
| 2,743,217 | 4/1956 | Silsby...................................... | 48/206 |
| 2,901,149 | 8/1959 | Richter.................................. | 222/367 |
| 2,914,223 | 11/1959 | Richter.................................. | 222/194 |
| 3,429,773 | 2/1969 | Richter.................................. | 162/246 |

FOREIGN PATENTS OR APPLICATIONS

| | | |
|---|---|---|
| 324,949 | 6/1970 | Sweden |
| 174,094 | 5/1959 | Sweden |

*Primary Examiner*—S. Leon Bashore
*Assistant Examiner*—Peter F. Kratz
*Attorney, Agent, or Firm*—Cushman, Darby & Cushman

[57] ABSTRACT

A method of continuously feeding coal or the like to coal gasifier means or the like operating under a predetermined elevated pressure and of continuously removing ash or the like therefrom in which the coal feeding and ash removing procedures are interrelated to provide energy conservation by removing heat from the ash and transferring the heat to the coal, such energy conservation being performed by means of the liquid medium (water) used to feed the coal and remove the ash. In the coal feeding procedure, coal is continuously introduced into a first low energy water circuit from which successive volumes of coal particles and entrained water are transferred to a second high energy water circuit during which transfer the first circuit gains water from the second circuit, the second circuit includes a first liquid volume having a free liquid surface maintained at a high pressure level at or near the pressure level of the gasifier through which the coal is moved to supply the gasifier. In the ash removal procedure, a second volume of water having a free surface is maintained at the outlet pressure of the gasifier to receive the discharged ash therethrough, the second volume of water forms part of a third high energy water circuit from which successive volumes of ash and entrained water are transferred to a fourth low energy water circuit, the heated water from the second and third circuits after ash removal therefrom is utilized to supply the loss of water from the second circuit and the excess cool water from the first circuit is utilized to control and maintain, in conjunction with a fresh cool water supply, the temperature and level of the second volume.

24 Claims, 2 Drawing Figures

CONTINUOUS PROCESS FOR ENERGY CONSERVING COOPERATIVE COAL FEEDING AND ASH REMOVAL OF CONTINUOUS, PRESSURIZED COAL GASIFIERS AND THE LIKE, AND APPARATUS FOR CARRYING OUT THE SAME

This invention relates to a process for cooperative coal feeding and ash removal for coal gasifiers and the like for conservation of energy by transferring heat from the ash to the coal by interchange of the fluid medium used for the coal feeding and ash removal.

Known methods of pressure feeding coal generally result in an energy penalty. Fixed bed coal gasifiers are fed coal through lock hoppers in a dry state. The lock hoppers must be pressurized and vented for each filling cycle requiring large energy consumption for pressurizing and venting the same gas again and again. These hopper feeding systems have no means of accepting heat from the ash produced during gasification. Fluidized bed and suspension type coal gasifiers are pressure fed coal in a slurry form, generally a mix of 50 percent water or oil and 50 percent minus 100 mesh pulverized coal. The liquid for such feeding systems is not easily separated from the coal. Heat is required to flash the liquid from the pulverized coal. The heat is generally obtained from the hot synthesis gas. The flashing off, using synthesis gas, introduces a condensible gas into the synthesis gas stream which must be later condensed out before sending the synthesis gas to the consumer. The flashing and condensing are great consumers of energy.

The known methods of pressurized ash removal involve primarily the use again of lock hoppers. The lock hoppers are used both for wet and dry pressurized removal of ash. The use of water in lock hopper ash removal provides a means of removing heat from the ash but the heated water has not been utilized to transfer heat to the coal feed. In lock hopper feeding of coal water is not used, and therefor the transfer of heat cannot be performed. The heated water can be used for the slurry pumping of coal but the transfer of heat does not significantly offset the energy losses of flashing and condensing the conveying liquid.

The object of this invention is to interchange the conveying liquid used for coal feeding with the liquid used for ash removal thus resulting in a transfer of heat from the ash to the coal. The feeding of coal is obtained by a combination of procedural steps which establishes a low energy liquid flow circulation loop. A second high energy liquid circulation loop is established in communication with the gasifier inlet means or other secondary equipment such as dryers, crushers, pulverizers, etc. being in communication with the gasifier inlet means. The feeding high energy and low energy liquid circulation loops are made common by a device that transmits coal from the low energy loop to the high energy loop. The ash removal system is similarly a combination of low and high energy liquid circulation loops. However, the transmission device transfers the ash from a high energy liquid loop to a low energy liquid loop. The coal feed and ash removal systems are made cooperative by an interchange of conveying liquid. The coal feeding transmission device consists of a number of through going pockets, each pocket being filled with coal when in communication with the low energy liquid circulation loop and emptied when coming in communication with the high energy liquid circulation loop. After being emptied by entraining coal into the high energy liquid circulation loop, the pocket contains nearly all liquid. When the pocket is again brought into communication with the low energy liquid circulation loop, the entering coal displaces liquid from the pocket equal to the coal's volume. Such displacement results in a transfer of liquid from the high to the low energy liquid circulation loop. This net gain in liquid to the feeding low energy liquid circulation loop is pumped to the ash high energy liquid circulation loop. A leakage of liquid exists across the feeding transmission device from the high to low energy liquid circulation loop resulting in an additional amount of liquid pumping to the ash high energy liquid circulation loop; therefore, the pumping of liquid from the feed low energy circulation loop to the ash high energy liquid circulation loop always exceeds the volume of coal being fed. The volume of liquid pumped from the feed low energy liquid circulation loop is a loss to the feed high energy liquid circulation loop. This loss of liquid from the feed high energy liquid curculation loop must be replaced or the feeding system will run dry. The makeup liquid is obtained hot from a common reservoir and pumped back into the feed high energy liquid circulation loop. Here lies the ability to transfer heat from the ash to the coal. The common reservoir receives hot liquid from the ash removal system.

The ash removal system high energy liquid circulation loop accepts the ash from the gasifier, cools the ash and moves the ash to a transmission device which is in communication with the ash low energy liquid circulation loop. The transmission device again contains through going pockets, said pockets filling with ash in communication with the high energy loop and discharging the ash when the pocket is in communication with the low energy loop.

Preferably the liquid used in the coal feed and ash removal systems is water. Water is desirable in that steam is normally used as a reactant gas during the production of synthesis gas. The entry point of ash into the ash removal high energy liquid circulation loop is a free water surface being at or near the bottom of the gasifier. A normal technique in gasifier operation is to spray water on the ash immediately after the combustion zone to produce high temperature steam for use in the gasification. This reduces the ash temperature before the ash enters the water of the ash removal system high energy liquid circulation loop. The temperature of the ash would then enter the water surface at a temperature between 1500° to 2000° F. The water temperature in the ash removal system must be kept below 212° F to prevent flashing when the pressure drops to atmospheric during the ash transmission for gasifier pressure to atmospheric pressure. Knowing the above temperatures and assuming that coal is received at 70° F it is possible to determine the energy savings of the cooperative coal feeding and ash removal system. For a typical coal with an ash content of 10 to 15 percent the energy of the ash transferred to the coal is approximately 50 to 85 percent of that available, depending on the ash content of the coal and the ash temperature upon entering the water.

The energy transfer from the coal to ash is seen in the gasifier as a reduction in ash cooling water and a reduction in oxygen usage. The oxygen reduction is a result of less combustion needed to raise the coal to gasification temperature. The saving in oxygen for combustion is approximately 3 to 4 percent. The savings in combustion mean also an increase in synthesis gas production per unit mass of coal gasified since more coal is available for reaction.

Another object of the present invention is the provision of apparatus for carrying out the method, which apparatus is made up of a combination of components, each of which is known per se.

These and other objects of the present invention will become more apparent during the course of the following detailed description and appended claims.

The invention can best be understood with reference to the accompanying drawings wherein an illustrative embodiment is shown.

Figure 1:
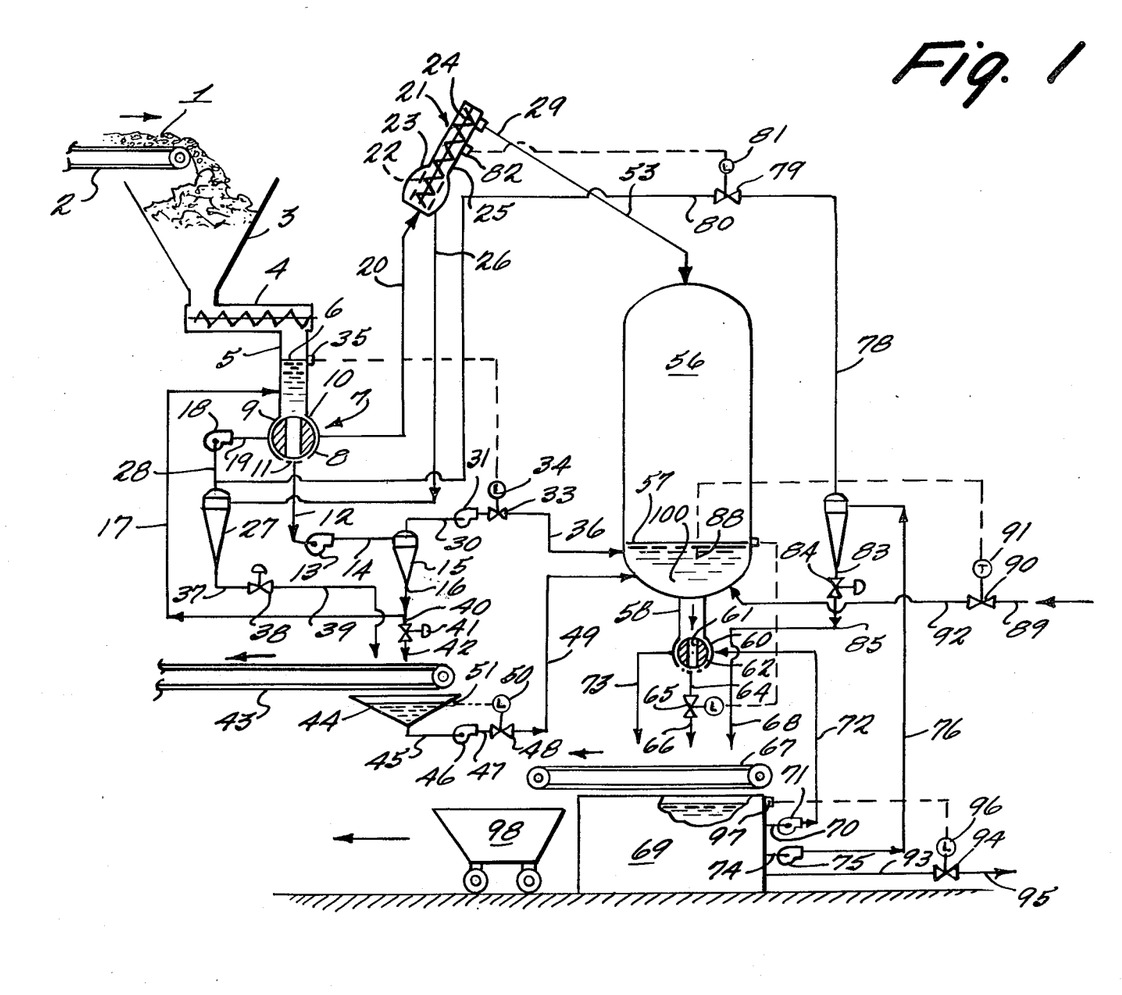
FIG. 1 is a schematic flow diagram illustrating the method and apparatus components of the present invention as applied to a fixed bed type coal gasifier.

One embodiment of the basic cooperative coal feed and ash removal system of the present invention is shown schematically in FIG. 1. Coal 1 is supplied in a predetermined particle size range by conveyor 2 or any other transfer method to bin 3. From bin 3 the coal is metered into chute 5 by a metering screw conveyor 4 or any other suitable metering device. Chute 5 is partially filled with water; the level of water being controlled constant. The coal 1 enters the water through the constant level, free liquid surface 6 whereupon the coal falls by gravity and by liquid drawing action into the through going pocket 10 of transmission device 7, rotor 9. The majority of the coal is retained in the pocket 10 by a screen 11 located in the transmission device housing 8. The water drawing through the transmission device 10 is performed by pump 13. Pump 13 motivates a low energy circulation loop through conduit 14, centrifugal clarifier 15, conduit 16, conduit 17, chute 5, transmission device pocket 10, screen 11 and conduit 12 back to pump 13. This low energy water circulation loop provides a means of filling pocket 10 more rapidly than by gravity flow. The low energy water flow through screen 11 can be used as a means to screen out fine coal from the feeding system. This will become more apparent during the course of the description.

The coal particles retained in pocket 10 are introduced into a high energy water circulation loop by the turning of rotor 9 causing the through going pocket 10 to come into communication with the high energy water circulation motivated by pump 18. The high energy water circulation loop operating at the pressure of the gasifier, starts at pump 18 through conduit 19, transmission device pocket 10, conduit 20, separator 21, screen 22, conduit 26, centrifugal clarifier 27 and conduit 28 back to pump 18. The coal particles entrained with the water in the high energy circulation are removed at separator 21. The water is drawn through screen 22 located within housing 23 and the coal is lifted from the water by screw 24 through a constantly controlled free liquid surface 25 and directed by conduit 29 to the gasifier or to drying, crushing and/or pulverizing apparatus in communication with the gasifier. The separator 21 is shown as inclined in FIG. 1; however, it may be of any form to cause the lifting of the coal from the water and directing the water back to the transmission device, said separator may be of the type of pending U.S. Pat. application Ser. No. 339,761 now U.S. Pat. No. 3,843,468 or similar device for directing the coal to multiple coal gasifiers. After pocket 10 has emptied all coal particles into conduit 20, pocket 10 contains nearly all water when again turning to communication with the low energy water circulation loop. When coal particles fill the pocket, the particles displace water in the pocket causing a net gain of water in the low energy water circulation loop and a net loss to the high energy water circulation loop; said gain or loss being equal in volume to the coal doing the displacing. There is an additional gain of water in the low energy water circulation loop caused by the leakage of water through the tolerance between the rotor 9 and housing 8 of transmission device 7; said leakage gain again resulting in a loss of water to the high energy water circulation loop.

The gain of water to the low energy water circulation loop will have a tendency to cause a rise in the level of free water surface 6 of chute 5. This water level rise is sensed by level sensor 35 which signals valve controller 34 to modulate the opening of valve 33 to maintain the water level constant. The modulating or throttling of valve 33 causes water to flow from the top of centrifugal clarifier 15. Centrifugal clarifier 15 directs the fine coal particles that have passed through screen 11 through the bottom of the clarifier with some water and clarified water through the top. Clarifying the water allows pump 31 to have the capability of pumping water to the pressure of the gasifier. The clarified water passes through conduit 30, is boosted in pressure by pump 31, passes through conduit 32, controlled in flow by valve 33 and is discharged into water chamber 100 for use in cooling of gasifier ash.

For fixed bad gasifiers, it is desirable to remove fine coal particles less ⅛ inch nominal size. Fines removal can be accomplished by proper sizing of screen 11 and then discharging water and fines from the bottom of centrifugal clarifier 15 through conduit 16, conduit 40, controllable valve 41 and conduit 42 on to straining conveyor 43 which may be mesh belt or vibrating table type conveyor. The coal fines are carried away by the conveyor while the water runs through to be collected in catch tank 44. The water received by catch tank 44 is pumped to water chamber 100 for use in cooling the gasifier ash, said water enters conduit 45, is pumped to gasifier pressure by pump 46, and is discharged from the pump 46 through conduit 47 to level control valve 48 and into chamber 100 through conduit 49. Level control valve 48 insures that pump 46 does not run dry by sensing the water level in catch tank 44 via sensor 51 which signals valve controller 50 to control valve 48 accordingly. Coal fines may also be extracted from the high energy water circulation loop by centrifugal clarifier 27 which can discharge coal fines and some water through conduit 37, controllable valve 38 and conduit 39 onto straining conveyor 43.

The net loss of water from the feeding system high energy water circulation loop is made up by pumping water back into the loop. In accordance with the principles of the present invention the water is obtained from a reservoir 69 which accepts hot water from the ash removal system. The hot water is drawn from reservoir 69 through conduit 74 by pump 75. Pump 75 discharges the hot water through conduit 76 to centrifugal clarifier 77 which knocks out ash fines through conduit 83, controllable valve 84, and through conduit 85 to be discharged on ash straining conveyor 67. Clarified hot water is discharged from the top of centrifugal clarifier 77 through conduit 78 to level control valve 79. Level sensor 82 senses the liquid level in separator 21 and signals level controller 81 to modulate valve 79 to sustain the liquid level accordingly. Hot water is discharged from valve 79 through conduit 80 to maintain the liquid level in separator 21. Conduit 80 is connected to the inlet side of pump 28 to prevent hot water removal from conduit 26 by clarifier 27 prior to its mixing with incoming coal. This replacement of hot water to the feeding system high energy circulation loop accomplishes the transfer of heat from the ash to the coal.

The procedural sequences of the ash removal system provide the hot water to reservoir 69. Hot ash falls into water chamber 100 to be cooled and removed from the gasifier system. The water chamber 100 is shown in FIG. 1 as being in the bottom of the gasifier, said water chamber may be separate from the gasifier but in communication with the gasifier ash outlet means. The ash drops and enters the water chamber free liquid surface 57 where the ash gives up its heat to the water in chamber 100. The water temperature in chamber 100 is kept at or below 212° F by the water entering the chamber from conduits 36 and 49. In many cases this entering water will not be sufficient to keep chamber 100 water below 212° F; for such event, ambient makeup water is introduced to chamber 100 via conduit 89, temperature control valve 90 which is modulated by temperature controller 91 receiving the temperature signal from sensor 88, and through conduit 92. The ash moves by gravity and liquid drawing into chute 58 and therefrom into transmission device 59, rotor 61, through going pocket 62 where the majority of the ash is retained by screen 63 located in the transmission device housing 60. The liquid drawing action is created by the flow of excess water from chamber 100.

The water injected into chamber 100 through conduits 36, 49 and 92 along with water displaced in the pocket 62 cause a tendency of level rise of free water surface 59. This level rise is prevented by water drainage through conduit 64, level control valve 65 and conduit 66 to discharge onto straining conveyor 67, said water drainage controlled by level sensor 87 signalling level controller 86 to modulate valve 65 for level control of free water surface 57. The ash retained in pocket 62 is brought into communication with a low energy water circulation loop as rotor 61 turns; said water circulation entraining the ash to be discharged at ambient pressure through conduit 73 onto straining conveyor 67. The low energy ash removal circulation loop is motivated by pump 71 which discharges water through conduit 72, transmission device 59, conduit 73, straining conveyor 67, reservoir 69, and conduit 70 back to pump 71. Ash is removed by straining conveyor 67 to refuse or to a hopper car 98 to carry the ash to refuse. Hot water discharged from conduits 73, 66 and 85 flows through the straining conveyor into reservoir 69. The water in the ash removal system is continuously maintained at or below 212° F to insure that flashing does not occur when the water pressure in the transmission device is let down to ambient pressure during the ash transfer. Reservoir 69 will have a tendency to overfill since ambient water is added to the ash removal system through conduit 92. The overfilling is prevented by draining through conduit 93, level control valve 94 and conduit 95. Level sensor 97 senses water level 68 and sends a signal to level controller 96 to open valve 94 to accomplish the draining. Water discharged from conduit 95 will be near 212° F and can be valuably used in other places in the gasification plant. For fixed bed gasifiers, such as illustrated in FIG. 1, the coal particles are directly injected into the gasifier 56 as shown by line 53 in FIG. 1.

From the above, the principles of the present method should be apparent. The apparatus components utilized in the coal feeding system are essentially the same as those embodied in the coal feeding system described in commonly assigned copending application Ser. No. 438,273 filed Jan. 31, 1974, the disclosure of which is hereby incorporated by reference into the present specification. Likewise, the apparatus components of the ash removal system are essentially the same as those embodied in the ash removal system described in my copending application Ser. No. 443,116 and now abandoned filed Feb. 15, 1974, the disclosure of which is hereby incorporated by reference into the present specification.

The present invention is not limited in its application to fixed bed gasifiers such as described above in connection with FIG. 1, but is equally applicable to fluidized bed gasifiers, suspended particle gasifiers and the like where the gasifier vessel is utilized not only for conversion of coal to gas but conversion of coal and the like to heat. The invention also has applicability where heat conversion only is contemplated.

Where the coal is utilized in finely sized particle form within the processing vessel, it is preferred to utilize a large particle feeding system (without the fine separation) and to feed the coal into a pressure zone where the coal is converted into dry finely sized form under pressure and fed to the processing vessel. The apparatus components for accomplishing this conversion under pressure is described in commonly assigned application Ser. No. 496,024 filed concurrently herewith in the name of Funk, Laakso and Prough, the disclosure of which is hereby incorporated by reference into the present specification.

Figure 2:
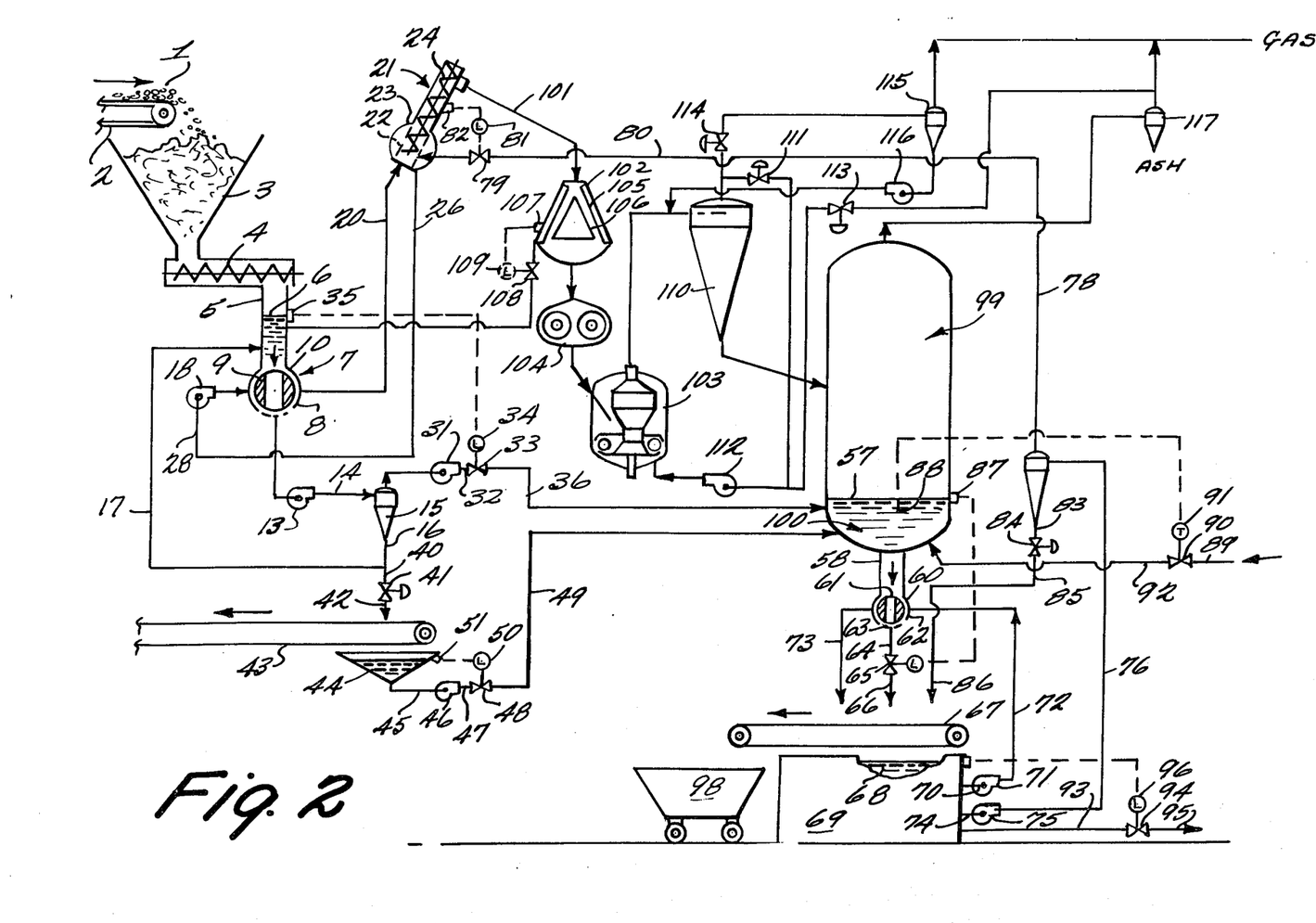
FIG. 2 is a view similar to FIG. 1 illustrating the application of the present invention to a fluidized bed type gasifier.

FIG. 2 illustrates the application of the principles of the present invention to a fluidized bed gasifier 99. In this arrangement the clarifier 27 is eliminated since the inclusion of fines in the feed coal is not deleterious to the functioning of the gasifier as is the case with fixed bed gasifiers. Clarifier 15 is retained to keep coal particles out of the ash removal system as much as possible. Since clarifier 27 is eliminated, hot water conduit can be connected anywhere within the high energy feed circuit. As shown, in FIG. 2, conduit 80 is connected directly to the liquid volume contained in separator 21.

Other than the changes noted above, the apparatus and method of the present invention are applied to the fluidized bed gasifier 99 in the same way as previously described and hence in FIG. 2 the common components have been designated with corresponding reference numerals. It will be noted that the outlet of the fluidized bed gasifier 99 is essentially the same as the outlet of the fixed bed gasifier 56 previously. The coal feed side differs in that the separator 21 does not discharge directly into the gasifier 99, as before, but rather into a pressurized zone, as indicated at 101, in which the coal from separator 21 is converted into dry finely sized coal and then fed to the gasifier 99.

As shown, coal discharged from separator 21 is initially directed by gravity to an apparatus to further remove surface water from the pressurized coal, such a mechanical dryer being depicted in FIG. 1 as a continuous vertical centrifuge 102. Such devices are known to operate effectively at or near atmospheric pressure. Operation at elevated pressure requires only increased housing strength. Continuous screen bowl centrifuges have been operated at elevated pressures. The drying apparatus used in the present invention is highly dependent upon the size and type of coal. The general purpose of the mechanical dryer in the present invention is to increase the thermal efficiency of the coal gasifier and to remove surface moisture from the coal to prevent caking of coal in a subsequent coal pulverizer 103. The coal gasifier can accept inherent moisture in the coal since the inherent moisture will flash to steam during combustion. This flashing to steam is not detrimental to the gasification from a reaction standpoint since steam is used in the synthesis gas production. For thermal efficiency, the inherent moisture must be considerably less than that required for reaction or a thermal loss to unused steam will transpire. Surface moisture on the coal, as fed into the pulverized 6, tends to cause the fine particles to conglomerate. This reduces the pulverizer capacity because of inability to effect efficient separation in the grinding zone. Drying may be accomplished in the pulverizer, but for efficient pulverizing, surface water entering the pulverizer must be minimized. Roughly 1% moisture will result in a 1 percent reduction in pulverizer capacity. Draining of the coal is improved by feeding coarse particles but feeding of coarse particles, greater than 1 inch requires a major size reduction before being introduced to the pulverizer 103. Such a major size reduction is accomplished by a crusher 104. Crushing the coal exposes new surface area thus reducing the ratio of surface moisture to surface area of coal after crushing and a subsequent increase in capacity of the pulverizer 103.

The mechanical drying can be accomplished by two basic methods: (1) by tabling which is a method of passing the coal over an oscillating table that shakes the coal causing water to migrate from the coal by gravity and pass from the table, said tabling being most effective on coals coarser than 1 inch size; and (2) by centrifuge separation which is a method of spinning the coal in a basket-like device where centrifugal forces sling the water from the coal. Both of these methods are continuous and lend themselves to be encased in pressurized housings for elevated pressure operation, requiring only rotary shelf seals. The centrifuge 102 is the preferred device since it has a greater ability to remove surface water from the smaller coal particles. For present purposes either type may be used or a combination of tabling and centrifuging may be used following a pressurized size screening; the coal size distribution and surface moisture content after draining being the determining factors.

The vertical centrifuge 102 depicted in FIG. 2 received coal by gravity from separator 21. The coal drops into an annular opening between the smaller end of two concentric spinning cones 105 and 106, the outer cone 105 being hollow to internally accept the inner cone. The outer cone 105 is screened. The two cones are rotating at nearly the same speed. The inner cone 106 contains a spiral scraper around its periphery, nearly touching the inner surface wall of the outer cone 105 from which the coal particles are to be scraped. The speed of the cones is chosen to allow to coal particles to be forced against the outer cone 105 while the water is discharged by centrifugal force through the outer cone 105 perforations. The differential speed between the two cones is selected to cause the scraper to move the coal to the larger end of the cones for dry discharge. If the cone angle is large, centrifugal forces will help roll the coal particles along. In this case, the scraper will tend to hold the coal particles back until they are dewatered, rather than push them ahead. The water passing through the perforations will pass to a trap in the dryer for draining back to chute 5. A free water surface is maintained in this trap to prevent gas escape. The level is maintained by level sensor 107 controlling the opening of a valve 108 via controller 109.

After being dried of surface water, coal is fed by gravity to the crusher 104 for major size reduction, such a size reduction being necessary to break up large particle coal in the supply to a size acceptable to the pulverizer 103. There are many types of commercial coal crushers that are acceptable, the limiting factor being the ability to operate at elevated pressures. The following types are adequate: Bradford breaker, single roll crusher, double roll crusher, Hammermill, ring crusher, cone crusher or jaw crusher. The crusher 104 represented in FIG. 2 is a double roll crusher.

Following crushing, the coal moves by gravity to the pulverizer 103 represented in FIG. 2 as a ball and race type crusher which is a common commercial type. Most pulverizers are capable of operating at elevated pressures since they are now designed to sustain pressures of 50 psig to meet "Fire Underwriters Code". A pulverizer using internal gas size classification is most desirable since hot gas may be used to further reduce the moisture content of coal. Drying during pulverizing is a common practice now using hot air. Pressurized ball mills, attrition mills, and ring-roll mills are additionally acceptable for the pulverizing step.

Since the coal gasifier 99 produces a hot synthesis gas, 2000° to 2,500° F, hot synthesis gas may be used in the pulverizer for further drying. The inherent moisture content will determine the necessity of this drying, such drying being dependent on the coal type and its properties. The pulverized coal is swept by gas velocity from the grinding zone of the pulverizer 103 through an internal classifier generally using the cyclone effect to cause the heavy coal particles, particles not sufficiently pulverized, to drop back into the grinding zone. The particles sufficiently pulverized will be swept by gas to a cyclone separator 110 where centrifugal forces of the spinning gas and coal cause the pulverized coal to drop out in the bottom of the cyclone separator. The purified gas flows from the top of the cyclone separator through a central pipe. For coal that is relatively dry of inherent moisture the gas will be mostly recycled to the pulverizer through valve 111 and fan 112. For coal that has too much inherent moisture the gas will be a combination of hot synthesis gas and recycle gas to control the temperature of the gas in the pulverizer above the dew point of the water inherent to the coal. This temperature control is accomplished by throttling valves 113 and 114. The typical control is: valve 114 is throttled open to allow cool gas to escape from the recycle system into the synthesis gas discharge to product use. While being discharged, the cool gas is passed through a secondary cyclone separator 115 to prevent caryover of coal fines to the product gas. A variable speed fan 116 recycles the carryover to cyclone separator 110. Valve 113 is additionally throttled open to allow hot synthesis gas to mix with the recycle gas. The combination of openings of valves 113 and 114 controls the recycle gas temperature. Valve 111 controls the gas velocity in the recycle system. This gas velocity may also be controlled by the speed of fan 112. Velocity control of the recycle gas is necessary for proper size classification of the coal in the pulverizer 103. Pulverized coal from cyclone separator 110 is directed to fluidized bed coal gasifier 99. Commercial gasifiers of this type are available for atmospheric pressure gasification of coal. Pulverized coal is directly injected into the fluidized bed gasifier 99, in most cases by a feed screw, not shown in FIG. 2. The pulverized coal is fluidized by the reactant gases, usually steam and oxygen for higher BTU synthesis gas production. Ash leaving the gasifiers is removed by a cyclone separator 117 prior to the takeoff of hot synthesis gas to the pulverizer 103.

The energy conservation by transfer of heat from the ash to the coal is simply and theoretically shown below. The energy saved is a function of the ash content of the coal being gasified and the temperature of the ash.

SIMPLE HEAT BALANCE 10% ASH

1. CONDITIONS:

a) ENTERING COAL TEMPERATURE $(T_{ci}) = 70°F$
   b) ASH CONTENT OF COAL = 10%
   c) ASH TEMPERATURE ENTERING CHAMBER 100 = 2000°F
   d) SPECIFIC HEAT OF COAL $(C_{Pc}) = 0.30$ BTU/lb°F
   e) SPECIFIC HEAT OF ASH $(C_{Pa}) = 0.20$ BTU/lb°F
   f) SPECIFIC HEAT OF WATER $(C_{Pw}) = 1.0$ BTU/lb°F
   g) GASIFICATION TEMPERATURE $(T_G) = 2800°F$
   h) DENSITY OF COAL $(\rho_C) = 85$ lbm/ft³
   i) DENSITY OF WATER $(\rho_W) = 62.4$ lbm/ft³
   j) TEMPERATURE OF COAL AFTER HEAT TRANSFER $= T_{HC}$

2. EQUATIONS FOR ASH SIDE:

a) $\bar{M}_{ASH} = 0.10\ \bar{M}_{COAL}$      $\bar{M}$ IS MASS RATE
                                      $\bar{Q}$ IS HEAT RATE
   b) $\bar{Q}_{ASH} = \bar{M}_{ASH}\ C_{Pa}\ (2000-212)$ AVAILABLE

3. EQUATIONS FOR COAL FEED SIDE:

a) $\bar{M}_{EW} = \left(\dfrac{\rho_W}{\rho_C}\right)\bar{M}_{COAL}$     EW — EXCHANGE WATER
   b) $\bar{Q}_{EW} = \bar{Q}_{COAL} = \bar{M}_C\ C_{PC}\ (T_{HC}-70)$

4. EQUATIONS FOR ENERGY SAVINGS:

a) PERCENT HEAT SAVINGS (H.S.) $= \dfrac{\bar{Q}_{COAL}}{\bar{Q}_{ASH}} \times 100$ b) PERCENT OXYGEN SAVINGS (O.S.) $= \dfrac{T_{HC}-T_{ci}}{T_G-T_{ci}} \times 100$

5. CALCULATIONS:

a) FIND TEMPERATURE $(T_{HC})$ OF COAL AFTER BEING HEATED BY EXCHANGE WATER BY USING EQUATIONS 3a and 3b.
   $\bar{M}_{EW}\ C_{PW}(212-T_{HC}) = \bar{M}_C\ C_{PC}\ (T_{HC}-70)$
   $\left(\dfrac{62.4}{85}\right)(1.0)(212-T_{HC})\bar{M}_C = \bar{M}_C(0.30)(T_{HC}-70)$
   $T_{HC} = 170.8°F$ b) FIND HEAT SAVINGS (H.S.) BY USING EQUATIONS 2a, 2b, 3b AND 4a H.S. $= \dfrac{\bar{M}_C\ C_{PC}\ (170.8-70)}{\bar{M}_a\ C_{Pa}\ (2000-212)} \times 100$ BUT $\bar{M}_a = 0.10\ \bar{M}_C$

THEN:

H.S. $= \dfrac{0.3(170.8-70)}{0.10(0.2)(2000-212)} \times 100$
   H.S. = 84.6% c) FIND OXYGEN SAVINGS (O.S.)

O.S. $= \dfrac{170.8-70}{2800-70} \times 100$
   O.S. = 3.6%

It thus will be seen that the objects of this invention have been fully and effectively accomplished. It will be realized, however, that the preferred specific embodiment has been shown and described for the purpose of illustrating the function of the process principles of this invention and is subject to change without departure from such principles. Therefore this invention includes all modifications encompassed within the spirit and scope of the following claims.

I claim:

1. A process of producing gas from gas producing particles, such as coal, by continuously feeding a supply of such particles into inlet means of gasifier means under a predetermined elevated inlet pressure, continuously heating the particles under pressure within the gasifier means to produce gas and ash particles and continuously discharging the ash particles from the gasifier means, the improvement therein which comprises the steps of:

confining a liquid, such as water, within a first feed path including a first volume defining a first free surface exposed to pressure conditions which are low with respect to the elevated inlet pressure of said gasifier means, progressively introducing a supply of gas producing particles into the first volume of liquid within said first confined path downwardly through the first free surface thereof, confining liquid within a circuitous second feed path including a second volume defining a second free surface spaced from said gasifier inlet means but in communication with a zone of elevated pressure including the inlet means of said gasifier means, continuously circulating the liquid within said circuitous second feed path by pumping the same at a pumping position spaced from said second volume, progressively removing successive incremental volumes of liquid and entrained gas producing particles within said first feed path and communicating said successive removed volumes of liquid and entrained gas producing particles with the liquid flowing in said second feed path at a position between said pumping position and said second volume, progressively collecting the gas producing particles within said second volume and moving the collected particles upwardly through said second free surface and then through said zone and into the inlet means of said gasifier means, confining liquid within a third discharge path including a third volume having a third free surface in communication with the gas pressure at the ash particle discharge end of the gasifier means, progressively discharging the ash particles into said third volume of liquid through the third free surface thereof, maintaining a continuous flow of liquid along a fourth discharge path at an energy level reduced with respect to the energy level of the liquid in said third discharge path, progressively removing successive incremental volumes of liquid and entrained ash particles from communication with said third discharge path and communicating said successive incremental volumes of liquid and entrained ash particles with the liquid flowing in said fourth discharge path, progressively separating the ash particles from the liquid at a separation position along said fourth discharge path downstream from the position of communication of said incremental volumes of liquid and entrained ash particles therewith, progressively directing liquid from at least one of said feed paths from which the gas producing particles have been separated into the liquid in one of said discharge paths to aid in maintaining said third volume at a temperature below boiling, and progressively directing liquid from at least one of said discharge paths which has been heated and from which ash particles have been separated into at least one of said feed flow paths so that the gas producing particles contacting the same within said feed paths will be heated by heat transfer therewith.

2. A process as defined in claim 1 wherein said successive incremental volumes of liquid and entrained gas producing particles are removed from said first feed path by maintaining a continuous flow of liquid and entrained gas producing particles from said first volume into an incremental volume removal position within said first feed path, blocking the flow of gas producing particles above a predetermined size at said incremental volume removal position while permitting liquid and gas producing particles less than said predetermined size to flow beyond said incremental volume removal position, and successively removing an amount of blocked gas producing particles and the liquid entraining the same at the time of removal equal to said incremental volume.

3. A process as defined in claim 2 wherein the liquid flowing in said first flow path is circulated therein by pumping the liquid flowing therein at a pumping position downstream of said incremental volume removal position into said first volume, the liquid flowing in said first flow path being purified by separation at a fine separation position downstream from said incremental volume removal position and said pumping position.

4. A process as defined in claim 3 wherein the progressive removal of said incremental volumes of liquid and entrained gas producing particles from said first feed path and communication thereof with said second feed path forms a part of a progressive exchange of incremental volumes between said feed paths, which progressive exchange further includes progressively removing successive generally equal incremental volumes of liquid from communication with said second feed path and communicating said successive equal volumes of liquid with the first feed path whereby said progressive exchange has the effect of tending to increase the liquid flowing in said first feed path and to decrease the liquid in said second feed path, and wherein the liquid in both of said feed paths is maintained substantially constant by utilizing the increase in liquid from said first feed path as the liquid directed into said one discharge path and by directing the aforesaid heated liquid separated from ash particles into said second feed path to replenish the decrease in liquid therein.

5. A process as defined in claim 1 wherein said successive incremental volumes of liquid and entrained ash particles are removed from said third discharge path by maintaining a continuous flow of liquid and entrained ash particles from said third volume into an incremental volume removal position within said third discharge path, blocking the flow of ash particles above a predetermined size at said incremental volume removal position within said third discharge path while permitting liquid and ash particles less than said predetermined size to flow beyond said incremental volume removal position within said third discharge path and successively removing an amount of blocked ash particles and the liquid entraining the same at the time of removal equal to said incremental volume.

6. A process as defined in claim 5 including the step of progressively separating the small ash particles and the liquid in said third discharge path at a position downstream from said incremental volume removal position therein.

7. A process as defined in claim 6 wherein the separation of ash particles and liquid in said third and fourth discharge paths is accomplished by directing the liquid and entrained ash particles in both discharge paths onto a continuously moving foraminous conveyor so that the ash particles are retained on the moving conveyor and subsequently discharged therefrom at a spaced discharge position while the liquid passes therethrough.

8. A process as defined in claim 7 wherein the liquid in both discharge paths separated from the ash particles by passage through said foraminous conveyor is collected in a common receptacle.

9. A process as defined in claim 8 wherein said fourth discharge path is maintained by pumping liquid from said receptacle.

10. A process as defined in claim 9 wherein said third volume is maintained at a predetermined temperature below boiling and at a predetermined level by sensing the temperature thereof and directing liquid from a supply in response to the liquid temperature sensed and by sensing the liquid level of said third volume and throttling the flow along said third discharge path at a throttling position between the incremental volume removing position and separation position therein in response to the level sensed.

11. A process as defined in claim 10 wherein the removal of successive volumes of liquid and entrained ash particles from communication with said third discharge path and the communication of said successive volumes of liquid and entrained ash particles with the liquid in said fourth discharge path is performed continuously in such a way that the quantity of flow in each discharge path is constant.

12. A process as defined in claim 11 wherein the gas producing particles moved upwardly through said second free surface and conveyed upwardly above said second free surface while allowing the liquid to drain therefrom by gravity back into said second volume and then are allowed to fall by gravity into said pressure zone.

13. A process as defined in claim 11 wherein said gas producing particles moved upwardly through said second free surface are coarse size particles and wherein the following enumerated steps are performed under pressure during the movement of said particles through said zone: (1) subjecting said coarse size particles to a surface liquid reducing treatment, (2) crushing the coarse size particles to an intermediate size which reduces the percentage of surface liquid associated therewith, (3) pulverizing the crushed particles to a fine size, (4) classifying and finally drying the pulverized particles and (5) feeding the dry pulverized particles into the inlet means of said gasifier means.

14. A process as defined in claim 13 wherein the aforesaid enumerated steps (4) and (5) are accomplished through movement of the particles by entrainment within a flowing heated gas stream maintained within said zone.

15. A process as defined in claim 14 wherein said surface liquid reducing treatment comprises subjecting the coarse size particles to a centrifugal force, restraining the movement of the coarse size particles in the direction of the application of said centrifugal force while allowing surface liquid to move in said direction to thereby separate the thusly moved portion of the surface liquid from said restrained coarse size particles.

16. A process as defined in claim 15 wherein the removed liquid is recirculated to said first feed path.

17. A process as defined in claim 16 wherein the progressive removal of said incremental volumes of liquid and entrained gas producing particles from said first feed path and communication thereof with said second feed path forms a part of a progressive exchange of incremental volumes between said feed paths, which progressive exchange further includes progressively removing successive generally equal incremental volumes of liquid from communication with said second feed path and communicating said successive equal volumes of liquid with the first feed path whereby said progressive exchange has the effect of tending to increase the liquid flowing in said first feed path and to decrease the liquid in said second feed path, and wherein the liquid in both of said feed paths is maintained substantially constant by utilizing the increase in liquid from said first feed path as the liquid directed into said third discharge path and by directing the aforesaid heated liquid separated from ash particles into said second feed path to replenish the decrease in liquid therein.

18. Apparatus for producing gas from gas producing particles, such as coal, including gasifier means for continuously heating the particles under a predetermined elevated pressure to produce gas and ash particles, said gasifier means having inlet means, means for continuously feeding a supply of gas producing particles into said inlet means of said gasifier means under said predetermined elevated inlet pressure, and means for continuously discharging the ash particles from the gasifier means, the improvement therein which comprises:

means for confining a liquid, such as water, within a first feed path including a first volume defining a first free surface exposed to pressure conditions which are low with respect to the elevated inlet pressure of said gasifier means.

means for progressively introducing a supply of gas producing particles into the first volume of liquid within said first confined path downwardly through the first free surface thereof, means defining a zone of elevated pressure including said inlet means of said gasifier means, meand for confining liquid within a circuitous second feed path including a second volume defining a second free surface spaced from said gasifier inlet means but in communication with said zone of elevated pressure, means for continuously circulating the liquid within said circuitous second feed path by pumping the same at a pumping position spaced from said second volume.

meand for progressively removing successive incremental volumes of liquid and entrained gas producing particles within said first feed path and communicating said successive removed volumes of liquid and entrained gas producing particles with the liquid flowing in said second feed path at a position between said pumping position and said second volume, means for progressively collecting the gas producing particles within said second volume and moving the collected particles upwardly through said second free surface and then through said zone including into the inlet means of said gasifier means, means for confining liquid within a third discharge path including a third volume having a third free surface in communication with the gas pressure at the ash particle discharge end of said gasifier means, means for progressively discharging the ash particles into said third volume of liquid through the third free surface thereof, means for maintaining a continuous flow of liquid along a fourth discharge path at an energy level reduced with respect to the energy level of the liquid in said third discharge path, means for progressively removing successive incremental volumes of liquid and entrained ash particles from communication with said third discharge path and communicating said successive incremental volumes of liquid and entrained ash particles with the liquid flowing in said fourth discharge path, means for progressively separating the ash particles from the liquid at a separation position along said fourth discharge path downstream from the position of communication of said incremental volumes of liquid and entrained ash particles therewith.

means for progressively directing liquid from at least one of said feed paths from which the gas producing particles have been separated into the liquid in one of said discharge paths to aid in maintaining said third volume at a temperature below boiling, and means for progressively directing liquid from at least one of said discharge paths which has been heated and from which ash particles have been separated into at least one of said feed flow paths so that the gas producing particles contacting the same within said feed paths will be heated by heat transfer therewith.

19. Apparatus as defined in claim 18 wherein said means for continuously removing successive incremental volumes of liquid and entrained gas producing particles from said first feed path comprises a transmission device comprising housing means having a first feed path inlet means and outlet means and second feed path inlet means and outlet means formed therein, a rotor rotatably mounted in said housing means having a plurality of separate pockets extending therethrough for alternately communicating between said first feed path inlet means and outlet means and said second feed path inlet and outlet means during rotation thereof within said housing means, and screen means in said first feed path outlet means.

20. Apparatus as defined in claim 19 wherein said ash particle separating means comprises a continuously moving foraminous conveyor, means for directing the ash particles and liquid in said fourth discharge path onto said moving conveyor so that the ash particles are retained thereon and subsequently discharged therefrom at a spaced discharge position while the liquid passes therethrough, and receptacle for receiving the liquid passing through said moving conveyor.

21. Apparatus as defined in claim 20 wherein said means for continuously removing successive incremental volumes of liquid and entrained ash particles from said third discharge path comprises a second transmission device comprising second housing means having first discharge path inlet means and outlet means and second discharge path inlet means and outlet means formed therein, a second rotor rotatably mounted in said second housing means having a plurality of second separate pockets extending therethrough for alternately communicating between said first discharge path inlet means and outlet means and said second discharge path inlet means and outlet means during rotation thereof within said second housing means, and second screen means in said first discharge path outlet means.

22. Apparatus as defined in claim 21 wherein means is provided for directing the liquid and small ash particles in said third discharge path flowing downstream of said second screen means onto said foraminous conveyor so that the small ash particles are retained thereon and subsequently discharged at said discharge position while the liquid passes through the moving conveyor into said receptacle.

23. Apparatus as defined in claim 22 wherein said means for directing liquid from at least one of said discharge paths into at least one of said feed paths comprises pump means for pumping liquid from said receptacle into said second feed path.

24. Apparatus as defined in claim 23 wherein control means is provided for maintaining said third volume of liquid at a predetermined temperature below boiling and the third free surface thereof at a predetermined level, said control means including means for sensing the temperature of said third volume of liquid, valve means for controlling the introduction of liquid from an ambient supply into third volume of liquid in response to the liquid temperature sensed by said temperature sensing means, means for sensing the level of the third free surface of said third volume, and means for throttling the flow along said third discharge path at a downstream throttling position in response to the level sensed by said level sensing means.

* * * * *